US007787449B2

(12) United States Patent
Cao

(10) Patent No.: US 7,787,449 B2
(45) Date of Patent: Aug. 31, 2010

(54) BUTTERFLY NETWORK WITH SWITCHES SET FOR TWO NODE DISJOINT PATHS AND METHOD FOR FORMING THE PATHS

(75) Inventor: Feng Cao, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 649 days.

(21) Appl. No.: 11/527,767

(22) Filed: Sep. 26, 2006

(65) Prior Publication Data

US 2007/0070993 A1 Mar. 29, 2007

Related U.S. Application Data

(63) Continuation of application No. 10/639,029, filed on Aug. 12, 2003, now Pat. No. 7,113,506, which is a continuation of application No. 09/328,046, filed on Jun. 8, 1999, now Pat. No. 6,618,371.

(51) Int. Cl.
*H04L 12/46* (2006.01)
(52) U.S. Cl. .................. 370/389; 370/360; 370/386
(58) Field of Classification Search .................. 370/54; 340/826
See application file for complete search history.

(56) References Cited

U.S. PATENT DOCUMENTS

| 4,349,702 A | * | 9/1982 | Joel, Jr. | ...... 340/2.71 |
| 4,706,240 A | | 11/1987 | Payne, III | ...... 370/60 |
| 4,845,736 A | | 7/1989 | Posner et al. | ...... 370/351 |
| 4,922,246 A | | 5/1990 | Cormen et al. | ...... 340/2.29 |

(Continued)

OTHER PUBLICATIONS

F. Thomas Leighton, "Introduction To Parallel Algorithms And Architectures: Arrays, Trees, Hypercubes," Section 3.2, The Butterfly, Cube Connected-Cycles, and Beneš Network, 1992, pp. 439-472.

(Continued)

*Primary Examiner*—Dang T Ton
*Assistant Examiner*—Pamit Kaur
(74) *Attorney, Agent, or Firm*—Campbell Stephenson LLP

(57) ABSTRACT

In a butterfly network, a number of switches are set to provide two paths that are independent of each other, from a first switch to a second switch, and from the first switch to a third switch respectively. Identification of switches to be set from among all switches in the butterfly network depends on the locations of the first switch, the second switch and the third switch relative to one another. The to-be-set switches are determined by starting with the first switch as a preceding switch, identifying the next switch for a path by simply changing the level number (e.g. incrementing the level number) of a preceding switch in the path, and by changing a bit of the row number of the preceding switch (e.g. by replacing the (α-th bit with a corresponding bit from the destination switch's row number), and repeating such acts with the just-identified switch as a preceding switch. The direction of the path is reversed on reaching a last level or a last row of the network. Such addressing techniques identify all switches that need to be used to form two node disjoint paths from the first switch to the second and third switches. The two paths can be used to redundantly couple a source switch to a destination switch, for load balancing, for fault tolerance, or for multicasting.

20 Claims, 6 Drawing Sheets

U.S. PATENT DOCUMENTS

| | | | |
|---|---|---|---|
| 4,933,936 A | 6/1990 | Rasmussen et al. | 340/825.5 |
| 5,040,173 A | 8/1991 | Richards | 340/2.71 |
| 5,153,843 A | 10/1992 | Batcher | 364/491 |
| 5,251,097 A | 10/1993 | Simmons et al. | 361/687 |
| 5,253,359 A | 10/1993 | Spix et al. | 714/30 |
| 5,361,363 A | 11/1994 | Wells et al. | 395/800 |
| 5,504,743 A | 4/1996 | Drefenstedt | 370/395.32 |
| 5,521,591 A * | 5/1996 | Arora et al. | 340/2.21 |
| 5,566,342 A | 10/1996 | Denneau et al. | 395/800 |
| 5,689,661 A | 11/1997 | Hayashi et al. | 395/311 |
| 5,842,207 A | 11/1998 | Fujiwara et al. | 707/7 |
| 5,940,367 A | 8/1999 | Antonov | 370/218 |
| 6,018,523 A | 1/2000 | Even | 370/389 |
| 6,185,220 B1 | 2/2001 | Muthukrishnan et al. | 370/411 |
| 6,205,532 B1 | 3/2001 | Carvey et al. | 361/707 |
| 6,370,145 B1 | 4/2002 | Dally et al. | 370/389 |
| 6,618,371 B1 * | 9/2003 | Cao | 370/388 |
| 2004/0205236 A1 | 10/2004 | Atkinson et al. | 709/238 |

OTHER PUBLICATIONS

F. Thomas Leighton, "Introduction To Parallel Algorithms And Architectures: Arrays, Trees, Hypercubes," Section 3.4++, Packet-Routing Algorithms, 1992, pp. 511-546.

F. Thomas Leighton, "Introduction To Parallel Algorithms And Architectures: Arrays, Trees, Hypercubes," Section 3.4.8, The Information Dispersal Approach To Routing, 1992, pp. 611-620.

F. Thomas Leighton, "Introduction To Parallel Algorithms And Architectures: Arrays, Trees, Hypercubes," Section 3.5.4, Randomized O (log N)-Step Sorting Algorithms, 1992, pp. 693-696.

F. Thomas Leighton, "Introduction To Parallel Algorithms And Architectures: Arrays, Trees, Hypercubes," Section 3.7.4, Application to Integer Multiplication, 1992, pp. 729-741.

Gupta, A.K.; Hambrusch, S.E., "Embedding Complete Binary Trees into Butterfly Networks," Computers, IEEE Transactions on vol. 40 Issue: 7, Jul. 1991, pp. 853-863.

Bornstein, C.; Litman, A.; Maggs, B.M.; Sitaraman, R.K.; Yatzkar, T., "On the Bisection Width and Expansion of Butterfly Networks," Parallel Processing Symposium, 1998.

* cited by examiner

BUTTERFLY NETWORK WITH SWITCHES SET FOR TWO NODE DISJOINT PATHS AND METHOD FOR FORMING THE PATHS

CROSS-REFERENCE TO RELATED APPLICATIONS

This application is a continuation of application Ser. No. 10/639,029 filed on Aug. 12, 2003 now U.S. Pat. No. 7,113,506, entitled "Butterfly Network With Switches Set For Two Node Disjoint Paths And Method For Forming The Paths," issued on Sep. 26, 2006, and naming Feng Cao as an inventor, which is a continuation of application Ser. No. 09/328,046 filed on Jun. 8, 1999 now U.S. Pat. No. 6,618,371, entitled "Butterfly Network With Switches Set For Two Node Disjoint Paths And Method For Forming The Paths," issued on Sep. 9, 2003, and naming Feng Cao as an inventor. These applications are incorporated by reference herein, in their entirety and for all purposes.

BACKGROUND

A switching network typically is made of input ports and output ports that are interconnected by switches and wires, as described in, for example, U.S. Pat. No. 5,521,591 (incorporated by reference herein in its entirety). As described in column 1, lines 17-19 of U.S. Pat. No. 5,521,591, each wire in the network serves as a conduit for transmitting a message from one of its ends to the other of its ends. The term wire (or connection) includes any means for communicating data between switches, such as electrical wires, parallel groups of wires, optical fibers, mulitplexed channels over single wires, or free space radio or optical communication paths. A switch (shown in FIG. 1 of U.S. Pat. 5,521,591 and attached hereto as FIG. 1) is an atomic unit that Resembles a swithching network in function (i.e., a switch has input ports 1A and 1B and output ports 1C and 1D, and connects the input ports to the output ports in any desired pattern).

A switching network may route any kind of digital or analog data including voice or video signals. In some networks, the routing is accomplished by setting of switches so that input ports become directly coupled to ports (e.g., in a telephone network). In other networks, the inputs ports do not become directly coupled to the output ports. Instead, the messages are routed as packets through the network in steps. Typical examples of networks in which switching networks are used include telephone networks, data networks, computer networks, and interconnection networks in parallel data processing systems.

A butterfly network 2 (shown in FIG. 5 of U.S. Pat. No. 5,521,591 and attached hereto as FIG. 2) is a common example of a switching network. Network 2 is referred to as a butterfly network because the connections between nodes form a pattern resembling a butterfly. A butterfly network has the same number of inputs as it has outputs. The inputs are connected to the outputs via a set of switches organized into successive levels of switches. An N-input, N-output butterfly network has $\log_2 N+1$ (hereinafter $\log_2$ will be referred to as 1 g) levels of switches, each level having N 2×2 switches. Each switch 3 in the butterfly 2 has a distinct reference label <L,r> where L is its level, and r is its row. In an N-input butterfly, the level L is an integer between 0 and 1 gN, and the row r is a 1 gN-bit binary number. The inputs and outputs reside on levels 0 and 1 gN, respectively. For L<1 gN, a switch labeled <L,r> is connected to switches <L+1,r> and <L+1,$r^{(L)}$> and, where $r^{(L)}$ denotes r with the Lth bit complemented.

U.S. Pat. No. 5,521,591 also teaches that "a butterfly contains just one path from each input port to each output port" (in level 8, lines 39-42), and suggests a "multibutterfly [that] contains many paths from each input to each output port" (column 8, lines 42-43). Regarding such a multibutterfly, U.S. Pat. No. 5,521,591 states (column 8, lines 43-46) "indeed, there is still just one logical (up-down) path from any input to any output, but this logical path can be realized as any one of several physical paths."

SUMMARY OF INVENTION

In a butterfly network in accordance with the invention, a number of switches are set to provide two paths that are independent of each other (also called "node disjoint paths"), a first path from a first switch to a second switch, and a second path from the same first switch to a third switch. The switches to be set (from among a number of levels of switches in the butterfly network) are identified by performing a number of predetermined operations depending on locations of the first switch, the second switch and the third switch relative to one another.

Specifically, the to-be-set switches are identified by: starting with a switch at the end of a path (e.g. the first switch) as a preceding switch, changing a level number (e.g. incrementing the level number) of the preceding switch, and changing a bit of the row number of the preceding switch (e.g. replacing with a corresponding bit (or its inverse) from the row number of the other path end switch), thereby to identify a next switch in the path. The just-described two acts of changing are repeated, with the just-identified next switch as the preceding switch, until the other end of the path is reached. During the repetition, if a boundary of the butterfly network is reached (e.g. the last level is reached), direction of the path is reversed (e.g. by decrementing the level number), and the repetition is continued.

The two paths that are identified can be used to transfer information (also referred to as "traffic") through the butterfly network. In one embodiment, the two paths are used to redundantly route traffic from a source switch to a destination switch, for load balancing or for fault tolerance. Specifically, if, in addition to the just-described two paths, the second switch and the third switch are directly coupled (also referred to as "connected") to one another in the butterfly network (with just a connection and no intervening switches), then the two paths and the connection form a "ring." Any two of the three switches in such a ring can be used as source and destination switches for routing the traffic through either or both paths in the ring. For example, initially a source switch is designated as the first switch, a destination switch is designated as the second switch, and any switch connected to the second switch is designated as the third switch. Thereafter, the two paths (from the first switch to the second and third switches) are identified, thereby to identify redundant routes between the source and destination switches.

If the second and third switches are not directly connected, but coupled through one or more switches (also called "intervening switches") in the butterfly network, then two paths and connections between the intervening switches form a ring that is used as described above. Irrespective of whether the second and third switches are coupled to each other, the same traffic can be multicast, from the first switch (source switch) over the first path and over the second path to each of the second switch and the third switch (both of which act as destination switches).

DETAILED DESCRIPTION OF THE PREFERRED EMBODIMENTS

Figure 1:
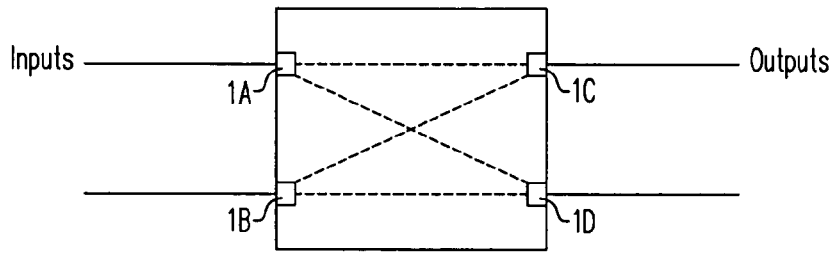
FIG. 1 illustrates, in a prior art block diagram, a switch 1 having two input ports 1A and 1B, and two output ports 1C and 1D.
Figure 2:
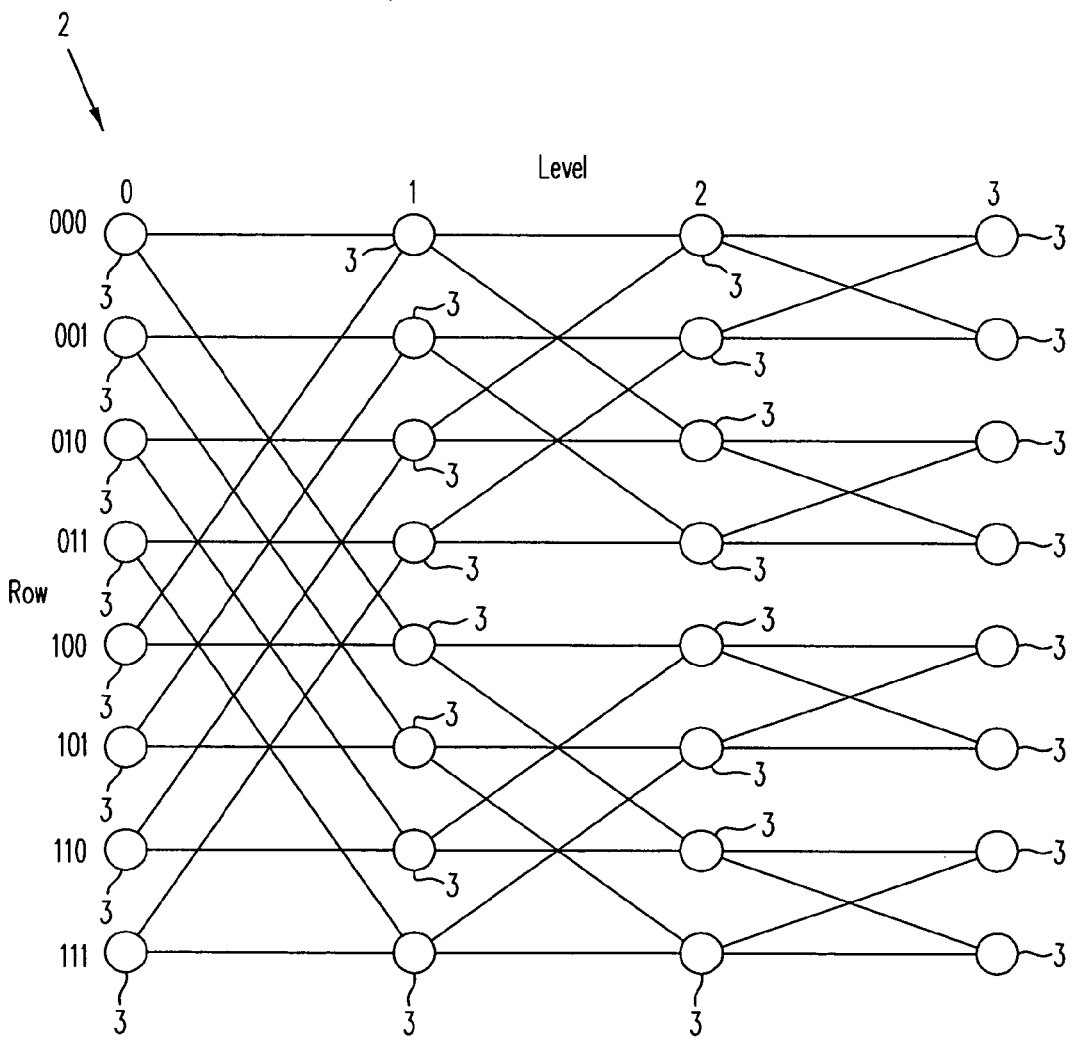
FIG. 2 illustrates, in a prior art block diagram, a butterfly network 2 having switches 3 of the type illustrated in FIG. 1.
Figure 3:
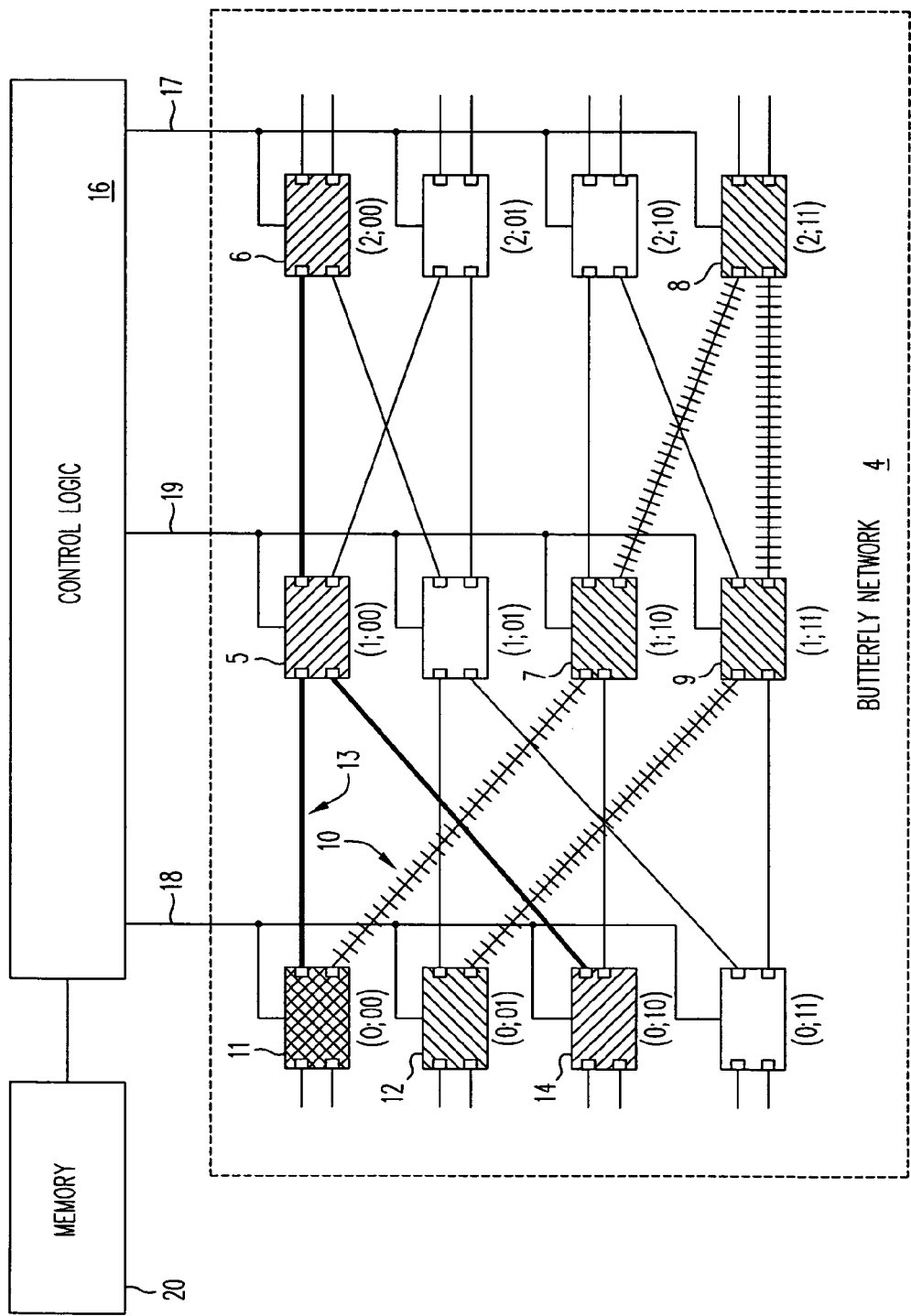
FIG. 3 illustrates, in a block diagram, a butterfly network 5 coupled to a control logic 6 that sets switches in network 5 for a first path from a first switch <0; 00> to a second switch <0; 01>, and for a second path from the same first switch <0; 00> to a third switch <0; 10>.

In a butterfly network 4 (FIG. 3), a number of switches 5-9 are set (shown hatched in FIG. 3) in accordance with the invention to provide two paths 10 and 13 that are independent of each other (also called "node disjoint paths"). A first path 10 (shown in FIG. 3 as ++++) is formed from a first switch 11 to a second switch 12, and a second path 13 (shown in FIG. 3 as a thick line) is formed from the same first switch 11 to a third switch 14. Network 4 is coupled to a control logic 16, e.g. by control buses 17-19 that carry the signals generated by logic 16 for setting of switches 5-9 to form paths 10 and 13. Control logic 16 may be coupled to, for example, a memory 20 that may hold, in tables, the signals provided by logic 16 on buses 17-19.

Figure 5:
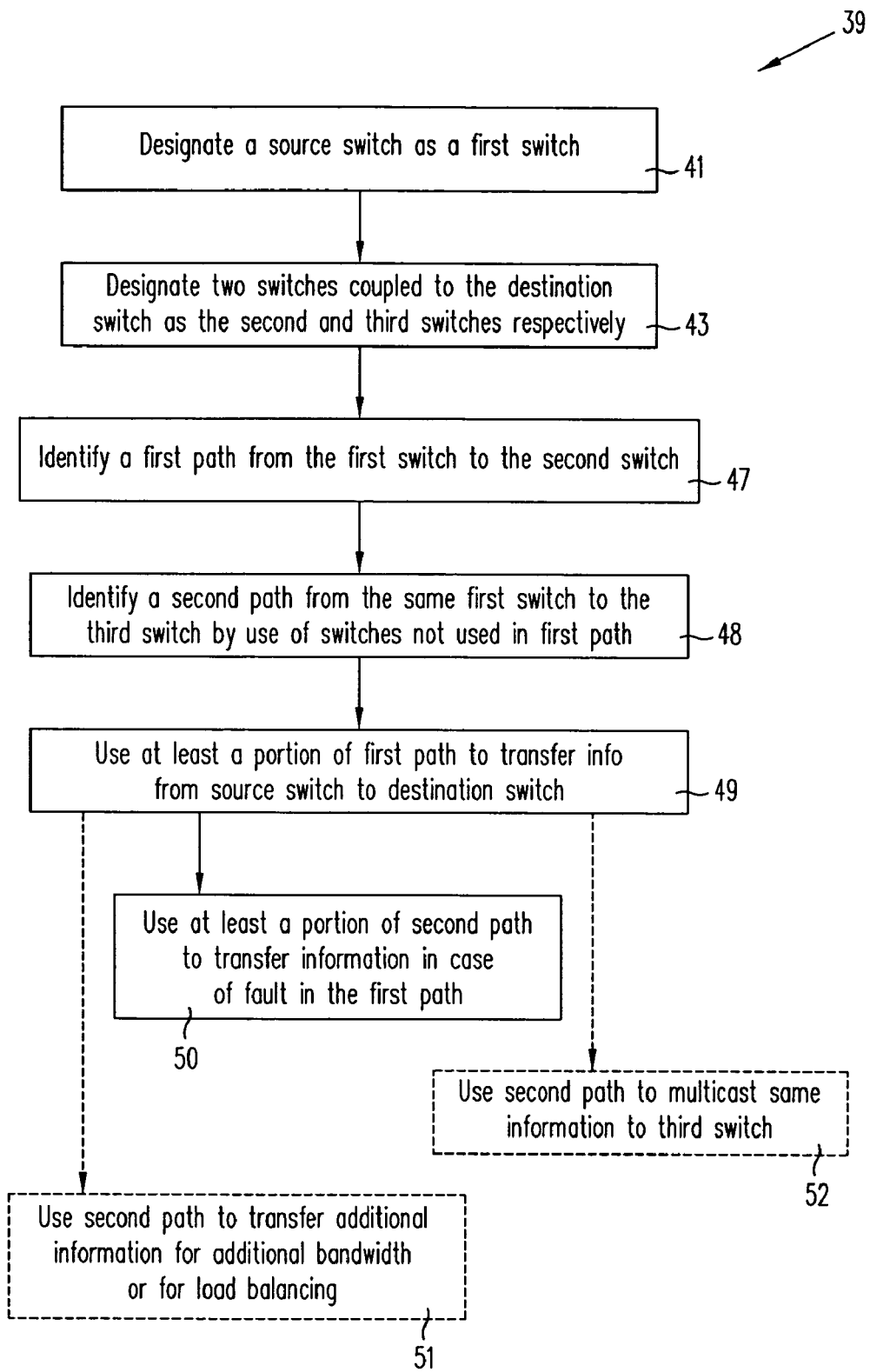
FIG. 5 illustrates, in a flow chart, operations performed prior to and subsequent to the operation s of FIG. 4.

Switches 5-9 that are set are identified (from among all switches in butterfly network 4) by performing a number of predetermined operations depending on locations of first switch 11, second switch 12, and third switch 14 relative to one another. Paths 10 and 13 that are formed by control logic 16 are each independent of the other (also referred to as "node disjoint"), because switches 7, 8 and 9 of path 10 are different from switches 5 and 6 of path 13. Such node disjoint paths are useful for load balancing, fault tolerance and multicasting (as described below in reference to FIG. 5 for butterfly networks).

Note that each switch in network 4 is labeled with a label <c; r> in the manner described above in reference to U.S. Pat. No. 5,521,591. Specifically, c is a level number in the range $0, \ldots i, \ldots n$ (e.g. n=2 in FIG. 3) with each level having $N=2^n$ switches (e.g. N=4 in FIG. 3), and r is a row number in the range $0, \ldots N-1$ (e.g. r=3, shown as binary "11" in FIG. 3). For example, switches 11, 7, 8, 9 and 14 for first path 10 are labeled <0; 00>, <1; 10>, <2; 11>, <1; 11> and <0; 10> respectively, and switches 11, 5, 6, 14 for second path 13 are labeled <0; 00>, <1; 00>, <2; 01>, and <0; 01> respectively.

Note also that each switch in network 4 has two ports that are connected to switches in a previous level (also called "X" ports; see the ports of switch 5 in FIG. 3 that are connected to switches 11 and 14), and two additional ports (also called "Y" ports) that are connected to switches in a next level. Specifically, the X port of each switch labeled <c; r> except for c=0 is connected (by a wire, also called "straight wire") to a Y port of a switch in an adjacent level and the same row, e.g. labeled <c−1; r>. Another X port of each switch labeled <c; r> except for c=0 is connected (by another wire, henceforth "cross wire") to another Y port of a switch in the same adjacent level, but in a different row, e.g. labeled <c−1; s>, wherein each bit si=ri except for a single bit s(c−1) being inverse of a corresponding bit r(c−1).

Paths 10 and 13 are formed by generating labels of switches in these paths (e.g. by incrementing the level number and optionally changing a bit of the row number), and setting switches identified during the label generation. If during the label generation, a boundary of butterfly network 4 is reached (e.g. the last level 2 is reached), direction of the path is reversed (e.g. by switching from incrementing the level number to decrementing the level number) and the label generation is continued. Note that at least switches located at the boundary of a butterfly network in accordance with the invention have sufficient circuitry (e.g. multiplexers and demultiplexers) to route traffic between the two X ports (or two Y ports), thereby to permit traffic received from a switch in a level L to be transmitted to another switch in the same level L. In contrast, U.S. Pat. No. 5,521,591 fails to disclose or suggest that two X ports (or two Y ports) can be coupled to one another.

In a method 20 (FIG. 4) in one embodiment, first path 10 (FIG. 3) is formed (as illustrated by operation 21) by performing the following acts: (a) designating (as illustrated by act 22) first switch 11 to be a preceding switch in first path 10, (b) generating (as illustrated by act 23) the label of a next switch by incrementing (or decrementing) the column number of the preceding switch, and optionally changing a bit of the row number of the preceding switch, to obtain a label of the next switch, (c) checking (as illustrated by act 24) if the generated label is the same as the label of the second switch 12 (FIG. 3), (d) if the decision in act 24 is yes, setting (as illustrated by act 25) all switches having the labels generated by act 23, (e) if the decision in act 24 is no, checking (as illustrated by act 26) if the level number in the most recently generated label is equal to n or to 0 (i.e. checking for boundary), (f) if the decision in act 26 is no returning to act 23, and (g) if the decision in act 26 is yes then the act performed to change levels is reversed (e.g. from incrementing the level number to decrementing or vice versa), followed by returning to act 23.

Method 20 also performs another operation 31 that is similar to operation 21 described above, except that in operation 31, switches in a second path 13 (FIG. 3) are identified and set. Note that the reference numerals for acts in operation 31 are obtained by adding 10 to the corresponding reference numerals of similar or identical acts in operation 21. Specifically, act 32 is identical to act 22 (described above), i.e. the same first switch is designated as the preceding switch in second path 13. Moreover, act 33 is similar to act 23, with level number being generated in an identical manner but the row number being changed in a different manner (so that two different ports of first switch 11 are used by the two paths 10 and 13) when going to switches in the adjacent level. The remaining acts 34-37 are identical to acts 24-27 described above.

Figure 4:
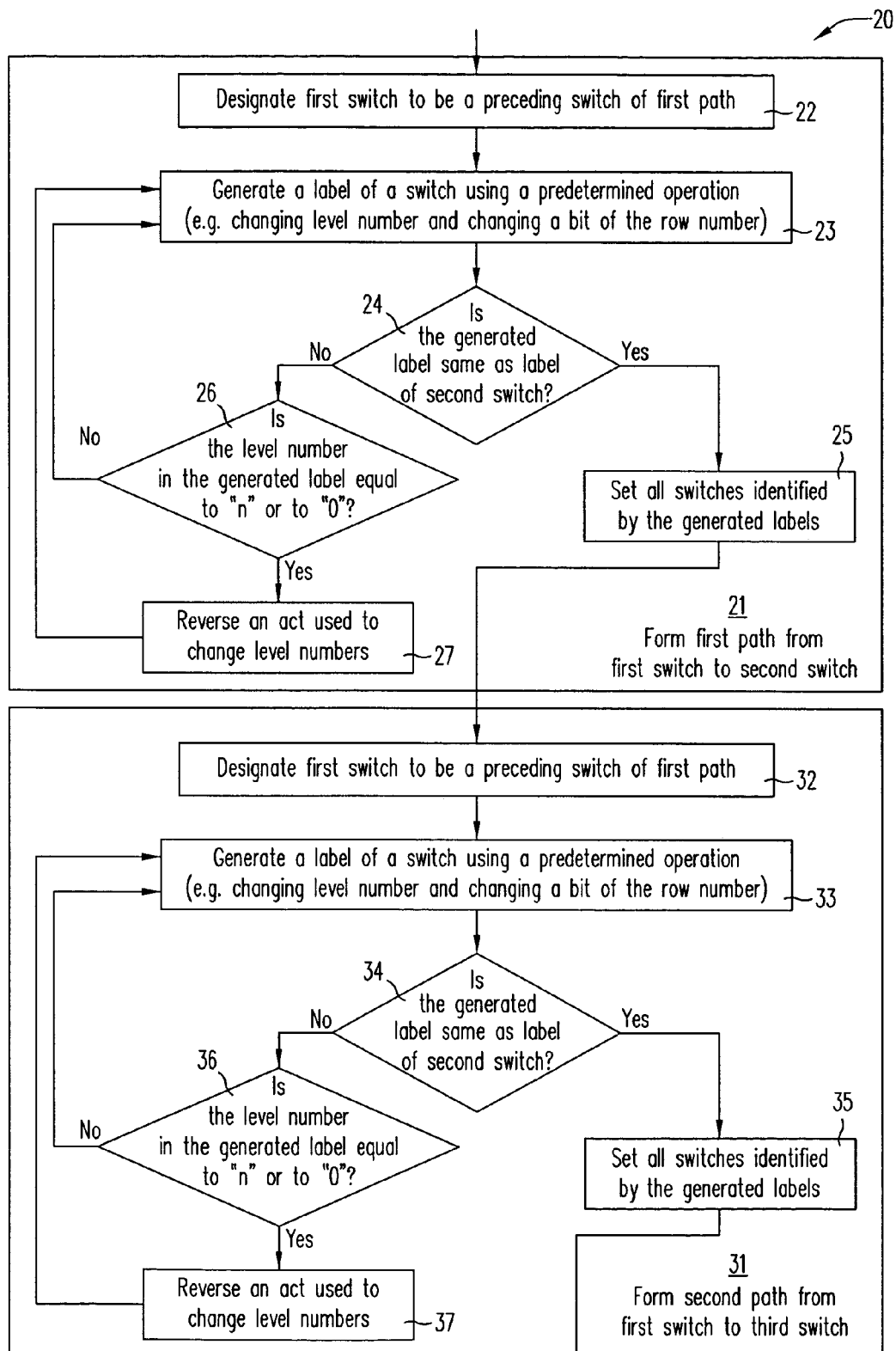
FIG. 4 illustrates, in a flow chart, operations performed to form the two paths illustrated in FIG. 3.

Method 20 illustrated in FIG. 4 and described above generates node disjoint paths (e.g. paths 10 and 13 in FIG. 3) within any butterfly network, and can be used for transferring information in a fault tolerant manner through such a network. As the connectivity of a butterfly network is two, there are at least two switches that are coupled to any switch in the butterfly network. For example, a method 39 (FIG. 5) can be used to generate redundant paths in another butterfly network

40 (FIG. 6) by: (a) designating (as illustrated by act 41 in FIG. 5) a source switch (e.g. switch 42 in FIG. 6) as the first switch, (b) designating (as illustrated by act 43 in FIG. 5) as the second and third switches respectively two switches (e.g. switches 44 and 45 in FIG. 6) that are coupled to a destination switch (e.g. switch 46), (c) identifying (as illustrated by act 47 in FIG. 5) a first path from the first switch to the second switch by generating labels as described in reference to FIG. 4, (d) identifying (as illustrated by act 48 in FIG. 5) a second path from the first switch to the third switch by generating labels as described in reference to FIG. 4, (e) using (as illustrated by act 49) at least a portion of the first path to transfer the information (such as data packets or analog voice/video signals) from the source switch to the destination switch, and (f) using (as illustrated by act 50) at least a portion of the second path to transfer the same information from the source switch to the destination switch in case of a fault in the first path.

In an alternative embodiment, instead of act 50, another act 51 is performed by using at least a portion of the second path to transfer additional information (e.g. different packets) from the source switch to the destination switch (e.g. for load balancing in a packet switched network, or to provide additional bandwidth in a circuit switched network). In another alternative embodiment, instead of act 50, another act 52 is performed by using at least a portion of the second path to transmit the same information to the third switch, in addition to the destination switch (thereby to multicast the information to different switches). Note also that in method 20, instead of act 43, another act (not shown) can be performed, by designating the destination switch as the second switch and designating another switch that is connected to the destination switch as the third switch. Numerous such modifications and adaptations of the embodiments described herein will be apparent to an engineer skilled in computer and communication networks, in view of the disclosure.

In one implementation, each of the first, second, and third switches (e.g. switches 42, 44 and 45 in FIG. 6 that are labeled <0; 000>, <0; 011> and <0; 111> respectively) are located in a single level $\alpha$ (e.g. $\alpha$=0), and switches of a first path are identified by: (a) increasing the level number of the first switch by 1, and replacing the $\alpha$-th bit in the first switch's row number with an inverse of the $\alpha$-th bit in the second switch's row number to identify a next switch (e.g. switch 54 labeled <1; 100>; (b) using the just-identified switch (e.g. switch 54) as the preceding switch, and increasing the level number of the preceding switch's level number g by 1, and replacing the g-th bit in the preceding switch's row number with the g-th bit in the second switch's row number to identify a next switch (e.g. switch 55 labeled <2; 110>), unless g=n; (c) repeating act (b) (e.g. to identify switch 56 labeled <3; 111>), unless g=n.

When the last level (e.g. nth column) is reached (e.g. switch 56), the first path reverses direction, and the next switch in the first path is identified by: (d) decreasing the preceding switch's level number by 1 and maintaining the same row number, unless g=$\alpha$+1 (e.g. to identify switch 57 labeled <2; 111>; (e) repeating act (d) (e.g. to identify switch 46 labeled <1; 111>), unless g=$\alpha$+1; (f) decreasing the preceding switch's level number by 1 to obtain p, and replacing the p-th bit in the row number of the preceding switch with the p-th bit in the second switch's row number to identify yet another switch in the first path, unless p=−1; (g) repeating act (f) with the "yet another switch in the first path" as the preceding switch unless p=−1; and (h) increasing level number of "yet another switch" by 1, unless p=$\alpha$. Therefore, switches 54, 55, 56, 57 and 46 are identified for first path from first switch 42 to second switch 44.

In the above-described case, this embodiment identifies switches in another path (also called "second path") from first switch 42 to third switch 45 by: (i) increasing the first switch's level number by 1, and replacing the $\alpha$-th bit in the first switch's row number with the $\alpha$-th bit in the second switch's row number to identify a switch (e.g. switch 58 labeled <1; 000> in the second path; (j) increasing the level number g of a preceding switch (e.g. switch 58) in the second path by 1, and replacing the g-th bit in the row number of the preceding switch in the second path with the g-th bit in the third switch's row number to identify another switch (e.g. switch 59 labeled <2; 010>) in the second path, unless g=n, and (k) repeating act (j) with the most recently identified switch (e.g. switch 60) as the preceding switch in the second path, unless g=n (e.g. switch 60 labeled <3; 011>)

When the last level is reached, the second path also reverses direction, and the next switch in the second path is identified by: (1) decreasing the preceding switch's level number by 1, unless g=$\alpha$+1 (e.g. to identify switch 61 labeled <2; 011>); (m) repeating act (1) unless g=$\alpha$+1 (e.g. to identify switch 62 labeled <1; 011>); (n) decreasing the preceding switch's level number by 1 to obtain p, and replacing the p-th bit in the row number of the preceding switch with the p-th bit in the third switch's row number to identify yet another switch in the second path, unless p=−1; (o) repeating act (n) with the "yet another switch in the second path" as the preceding switch unless p=−1; and (p) increasing level number of the preceding switch by 1, unless p=$\alpha$. Therefore, switches 58-62 are identified for second path from first switch 42 to third switch 45.

Note that one or more of the acts described above in reference to first and second paths between switches 42, 44 and 45 (FIG. 6) may be skipped, e.g. if a destination switch has been already reached. Therefore, acts (f), (g), and (h) are skipped during formation of first path 63 (FIG. 6), when switch 46 is identified, because switch 46 is already known to be coupled to switch 44. Similarly, acts (n), (o), and (p) are skipped during formation of second path 64 (FIG. 6), when switch 62 is identified, because switch 62 is already known to be coupled to switch 45. Note also that switches for paths 63 and 64 need not be set when performing method 39. Instead, only a portion of the first path (from switch 42 to switch 46) is used to route (as illustrated by act 49 in FIG. 5) traffic from source switch to destination switch (e.g. from switch 42 to switch 46). Therefore in the example illustrated in FIG. 6, a wire 65 located between destination switch 46 and third switch 44 is not used, although switch 44 is a portion of path 63.

Thereafter, when a fault is detected in the route (not labeled) between switches 42 and 46, act 50 is performed, e.g. by using second path 64 to route traffic between switches 42 and 46. Specifically, in addition to path 64, a wire 66 between switches 45 and 46 is used to complete the route between switches 42 and 46. Note that instead of act 50, other acts 51 and 52 can also be performed as described herein.

Figure 6:
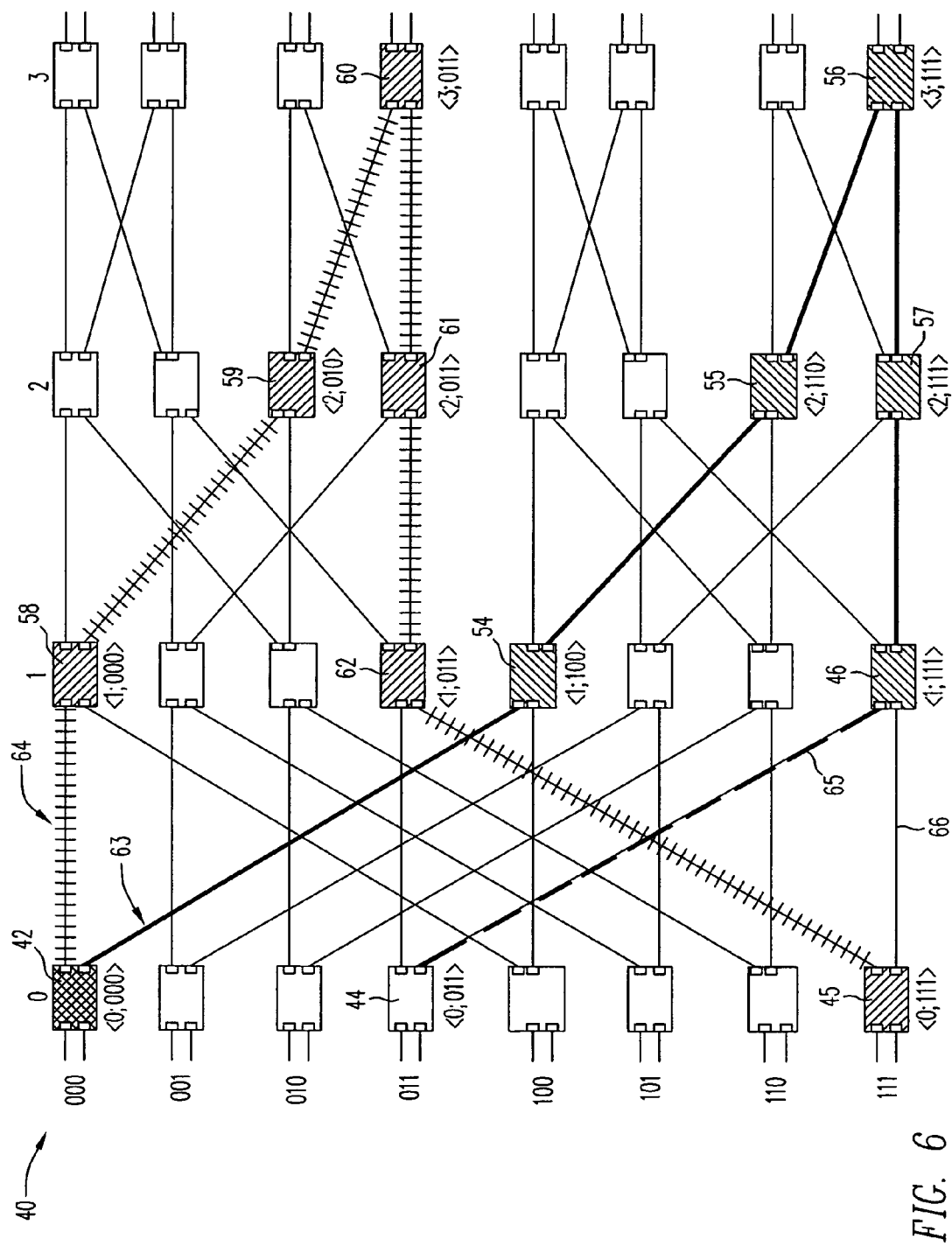
FIG. 6 illustrates, in a block diagram, two node disjoint paths in a four level butterfly network in accordance with the invention.

In FIG. 6, the second path between switches 42 and 46 includes six intermediate switches (namely switches 58, 59, 60, 61, 62, and 45) and the first path between the same switches includes four intermediate switches (namely switches 54, 55, 56, and 57). Therefore, the two paths have approximately the same number of switches (difference of just one or two switches, so that in a large butterfly network (e.g., N=32 or more) the length is approximately the same for the two paths. Note that even when transfer of information between two or more switches is redundant (e.g. between switches 5 and 6 in FIG. 3), such transfer may be performed when carrying real time information, such as audio, video, control and status, so that a switch from one path to the other results in no noticeable difference to the user (i.e. latency through the network remains almost the same before and after a failover).

Note that acts (a)-(p) that have been described above are performed only when each of first switch, second switch and third switch are in a common level. As described more completely below, acts similar or identical to acts (a)-(p) can be used for butterfly networks of different levels, and for different locations of the source and destination switches, to identify two independent paths through a butterfly network.

In another method of the invention, first switch has label <α; a0,a1,a2, ... a(n−1)>, with a0 being the bit of row number a at position 0, and so on, second switch has label <β; b0,b1, b2, ... b(n−1)>, and third switch has label <δ; d0,d1,d2, ... d(n−1)>. For clarity, commas are used to separate adjacent row bits, although during normal use no commas are present and the row number is used to identify a row in the normal manner.

If each of first switch, second switch and third switch are in the same level cc, and if for at least one value of i≧α there is a bit bi=1−di, switches having the following labels are used to identify (and form) the two node disjoint paths through the butterfly network. Note that if the just-described first condition is satisfied, but the second condition is not, then the row bits are reversed in position relative to one another, i.e., the position of each switch is changed from (c; r0r1 ... r(n−1)) to (n−c; r(n−1), r(n−2), ... r0) to obtain another butterfly network that satisfies both conditions. Specifically, the first path includes switches having the following labels (note that only the legal values are used, e.g. if n=2, then there are only 2 bits in the row number e.g. bits a0 and a1, and if α=2, then bits (1−bα)a(α+1) that are used in the very first label below do not exist, and only bits a0a1 are used as the row number:

<α+1; a0,...a(α−1),(1− bα),a(α+1),...a(n−1)>,
<α+2; a0,...a(α−1), (1− bα),b(α+1),a(α+2),...a(n−1)>,
through
<n; a0,... a(α−1), (1− bα),b(α+1),b(α+2),...b(n−1)>,
through
<α+1; a0,...a(α−1), (1− bα),b(α+1),b(α+2),...b(n−1)>,
<α; a0,...a(α−1),bα,b(α+1),b(α+2),...b(n−1)>,
<α−1; a0,...a(α−2),b(α−1),bα,b(α+1),b(α+2),...b(n−1)>,
through
<0; b0,...b(α−1),bα,b(α+1),b(α+2),...b(n−1)>,
through
<β−1; b0,...b(n−1)>.

Similarly, the second path includes switches having the following labels (note again that only the legal values are used):

<α+1; a0,...a(α−1),bα,a(α+1),a(α+2),...a(n−1)>,
<α+2; a0,...a(α−1),bα,d(α+1),a(α+2),a(α+3),...a(n−1)>,
through
<n; a0,... a(α−1),bα,d(α+1),d(α+2),...d(n−1)>,
through
<α+1; a0,... a(α−1),bα,d(α+1),d(α+2),...d(n−1)>,
<α; a0,...a(α−1),dα,b(α+1),b(α+2),...b(n−1)>,
<α−1; a0,...a(α−2),d(α−1),dα,d(α+1),...d(n−1)>,
through
<0; d0,...d(α−1),dα,d(α+1),...d(n−1)>,
through
<δ−1; d0,...d(n−1)>.

If one or more of the first, second and, third switches are in different levels, then there are two possibilities: either β≦α≦δ or δ≦α≦β. For example, if β≦α≦δ and if there exists i no less than α, and ai and bi are distinct, and there exists j no more than α and aj and dj are distinct, then the first path includes switches having the following labels (note again that only the legal values are used).

<α+1; a0,...a(α−1),(1−bα),a(α+1),...a(n−1)>,
<α+2; a0,...a(α−1),(1−bα),b(α+1),a(α+2),...a(n−1)>,
through
<n; a0,... a(α−1),(1−bα),b(α+1),...b(n−1)>,
through
<α+1; a0,...a(α−1),(1−bα),b(α+1),...b(n−1)>,
<α; a0,...a(α−1),bα,b(α+1),...b(n−1)>,
<α−1; a0,...a(α−2),b(α−1),bα,b(α+1),...b(n−1)>,
through
<0; b0,...b(α−1),bα,b(α+1),...b(n−1)>;
through
<β−1; b0,... b(n−1)>

Similarly, the second path includes switches having the following labels (note again that only the legal values are used):

<α−1; a0,...(1−a(α−1)),aα,a(α+1),...a(n−1)>,
<α−2; a0,...d(α−2),(1−a(α−1)),aα,...a(n−1)>,
through
<0; d0,... d(α−2),(1−a(α−1)),aα,...a(n−1)>,
through
<α−1; d0,... d(α−2), (1−a(α−1)),aα,...a(n−1)>,
<α; d0,...d(α−2), (1−a(α−1)),aα,...a(n−1)>,
through
<n; d0,...d(α−1),dα,d(α+1),...d(n−1)>,
through
<δ−1; d0,......d(n−1)>.

If the above-described condition (i.e. condition β≦α≦δ)is satisfied, and if bi=ai for all i>α−1, and aj=dj for all j<α+1, then the first path includes switches having the following labels (note again that only the legal values are used):

<α−1; a0,...b(α−1),aα,a(α+1),...a(n−1)>,
<α−2; a0,...b(α−2),b(α−1), aα,...a(n−1)>,
through
<0; b0,... b(α−1),aα,...a(n−1)>,
through
<β−1; b0,... b(α−1),aα,...a(n−1)>.

In this case, the second path switches having the following labels (note again that only the legal values are used):

<α+1; a0,...aα,d(α+1),a(α+2),...a(n−1)>,
through
<n; a0,...aα,d(α+1),...d(n−1)>,
through
<δ−1; a0,...aα,d(α+1),...d(n−1)>.

If the above-described condition (i.e. condition β≦α≦δ) is satisfied, and if bi=1−ai for some i no less than α, and aj=dj for all j<α+1, then the first path includes switches having the following labels (note again that only the legal values are used):

```
<α+1; a0,...a(α-1),(1-dα),a(α+1),...a(n-1)>,
<α+2; a0,...a(α-1),(1-dα),b(α+1),a(α+2),...a(n-1)>,
through
<n; a0,... a(α-1),(1-dα),b(α+1),...b(n-1)>,
through
<α+1; a0,...a(α-1),(1-dα),b(α+1),...b(n-1)>,
<α; a0,...a(α-1)bα,b(α+1),...b(n-1)>,
<α-1; a0,...a(α-2),b(α-1),bα,b(α+1),...b(n-1)>,
through
<0; b0,...b(α-1),bα,b(α+1),...b(n-1)>
through
<β-1; b0,...b(n-1)>.
```

In this case the second path switches having the following labels (note again that only the legal values are used):

```
<α+1; a0,...a(α-1),dα,a(α+1),...a(n-1)>,
<α+2; a0,... a(α-1),dα,d(α+1),a(α+2),...a(n-1)>,
through
<n; a0,... a(α-1)dα,d(α+1),...d(n-1)>,
through
<δ-1; a0,... a(α-1),dα,d(α+1),...d(n-1)>.
```

If $\alpha \geq \beta \geq \delta$ and there exists $i > \alpha-1$ such that $bi=1-di$, then the switches for the first and second path described above in reference to the condition $\alpha=\beta=\delta$ are used. Thus, we assume that all bits $bi=di$ for $i > \alpha-1$ for $\alpha \geq \beta \geq \delta$ in the following. If condition $\alpha \geq \beta$ is satisfied, and if there exists $i > \alpha-1$ such that bit $bi=1-di$, and $j=\max\{i|bi=1-di\}$ and $\alpha-j>2$, then $\alpha-j=2m+1$ or $\alpha-j=2m+2$ for some $m \geq 1$, and the first path includes switches having the following labels (note again that only the legal values are used). In the just-described equation for j, the formula within {} means the positions at which the indices of the second and third switches are different (e.g., if second switch is labeled <1; 0111> and the third switch is <0; 111> then j=max {0} as only b0 is different, i.e. only b0=1-d0).

```
<α+1; a0,...a(α-1),(1-dα),a(α+1), a(α+2),...a(n-1)>,
<α+2; a0,...a(α-1),(1-dα),b(α+1),a(α+2)a(α+3),...a(n-1)>,
through
<n; a0,... a(α-1),(1-dα),b(α+1),b(α+2),...b(n-1)>,
through
<α+1; a0,...a(α-1),(1-dα),b(α+1),b(α+2),...b(n-1)>,
<α; a0,...a(α-1),(1-dα),b(α+1),b(α+2),...b(n-1)>,
<α-1; a0,...a(α-2),d(α-1),(1-dα),b(α+1),b(α+2),...b(n-1)>,
through
<j+m+1; a0,...a(j+m),(1-d(j+m+1)),... (1-dα),b(α+1),b(α+2),...b(n-1)>,
through
<α+1; a0,...a(j+m),(1-d(j+m+1)),...(1-d(α-1)),b(α+1),b(α+2),...b(n-1)>,
<α; a0,...a(j+m),(1-d(j+m+1)),...(1-d(α-1)),bα,b(α+1),...b(n-1)>,
<j+m+1; a0,...a(j+m),b(j+m+1),... bα,b(α+1),b(α+2),...b(n-1)>,
<j+m; a0,...b(j+m),b(j+m+1),... bα,b(α+1),b(α+2),...b(n-1)>,
through
<0; b0,...b(α-1),bα,b(α+1),b(α+2),...b(n-1)>,
through
<β-1; b0,...b(n-1)>.
```

In this case the second path switches having the following labels (note again that only the legal values are used):

```
<α+1; a0,...a(α-1),dα,a(α+1), a(α+2),...a(n-1)>,
<α+2; a0,...a(α-1),dα,d(α+1),a(α+2),a(α+3),...a(n-1)>,
through
<n; a0,... a(α-1),dα,d(α+1),d(α+2),...d(n-1)>,
through
<α+1; a0,... a(α-1),dα,d(α+1),d(α+2),...d(n-1)>,
<α; a0,...a(α-1),dα,b(α+1),b(α+2),...b(n-1)>,
<α-1; a0,...a(α-2),d(α-1),dα,d(α+1),...d(n-1)>,
through
<j+m+1; a0,...a(j+m),(1-b(j+m+1)),d(j+m+2),...d(α-1),...d(n-1)>,
through
<j; a0,...a(j-1),dj,(1-b(j+1)),...(1-b(j+m+1)),d(j+m+2),...d(n-1)>,
through
<j+m+2; a0,...a(j-1),dj,(1-b(j+1)),...(1-b(j+m+1)),d(j+m+2),...d(n-1)>,
<j+m+1; a0,...a(j-1),dj,(1-b(j+1)),...d(j+m+1),d(j+m+2),...d(n-1)>,
<j; a0,...a(j-1),dj,d(j+1),...d(j+m+1),d(j+m+2),...d(n-1)>,
through
<0; d0,...d(j-1),dj,d(j+1),...d(n-1)>,
through
<δ-1; d0,...d(n-1)>.
```

If condition $\alpha \geq \beta \geq \delta$ is satisfied, and if there exists $bi=1-di$ for some i, and $j=\max\{i|bi=1-di\}$ and $\alpha-j<3$, then $j<\alpha$ and $\alpha-j=1$ or $\alpha-j=2$, the second and third paths can be obtained by simplifying the two paths of $\alpha-j>2$ as above.

If $\alpha \geq \beta \geq \delta$ and $bi=di$ for all i, then $\beta > \delta$ and the second and third switches are at different levels. The first path includes switches having the following labels (note again that only the legal values are used):

```
<α+1; a0,...a(α-1),(1-dα),a(α+1),...a(n-1)>,
<α+2; a0,...a(α-1),(1-dα),b(α+1),a(α+2),...a(n-1)>,
through
<n; a0,...a(α-1),(1-dα),d(α+1),...d(n-1)>,
through
<α; a0,...a(α-1),(1-dα),d(α+1),...b(n-1)>,
<α-1; a0,...a(α-2),(1-d(α-1)),(1-dα),d(α+1),...d(n-1)>,
through
<β; a0,...a(β-1),(1-dβ),...(1-dα),d(α+1),...d(n-1)>,
<β-1; a0,...d(β-1),(1-dβ),...(1-dα),d(α+1),...d(n-1)>,
through
<0; d0,...d(β-1),(1-dβ),...(1-dα),d(α+1),...d(n-1)>,
through
<α+1; d0,...d(β-1),(1-dβ),...(1-dα),d(α+1),...d(n-1)>,
<α; d0,...d(β-1),(1-dβ),...(1-dα),d(α+1),...d(n-1)>
through
<β-1; d0,...d(n-1)>.
```

In this case the second path switches having the following labels (note again that only the legal values are used):

```
<α+1; a0,...a(α-1),dα,a(α+1),...a(n-1)>,
through
<n; a0,... a(α-1),dα,...d(n-1)>,
through
<α; a0,...d(α-1),dα,b(α+1),...b(n-1)>,
<α-1; a0,...a(α-2),d(α-1),dα,d(α+1),...d(n-1)>,
through
<0; d0,...d(n-1)>,
through
<δ-1; d0,...d(n-1)>.
```

Note that if condition $\alpha \geq \beta \geq \delta$ is satisfied, and if there exists $i > \alpha - 1$ such that $bi = 1 - di$ then the switches for the first and second paths described above in reference to the condition $\alpha = \beta = \delta$ are used.

Based on the symmetric property of a butterfly network, if the condition $\delta \leq \alpha \leq \beta$ is satisfied, then the row bits are reversed (wherein each switch is changed from (c; ror1 . . . r(n–1)) to (n–c; r(n–1)r(n–2) . . . ro) as described above) so that condition $\beta \leq \alpha \leq \delta$ is satisfied and the above-described paths for this condition are used. Moreover, if the condition of $\alpha \leq \beta \leq \delta$ is satisfied, the just described row bit reversal results in a butterfly network with the condition $\alpha \geq \beta \geq \delta$ being satisfied and the corresponding above-described paths are used.

Figure 7:
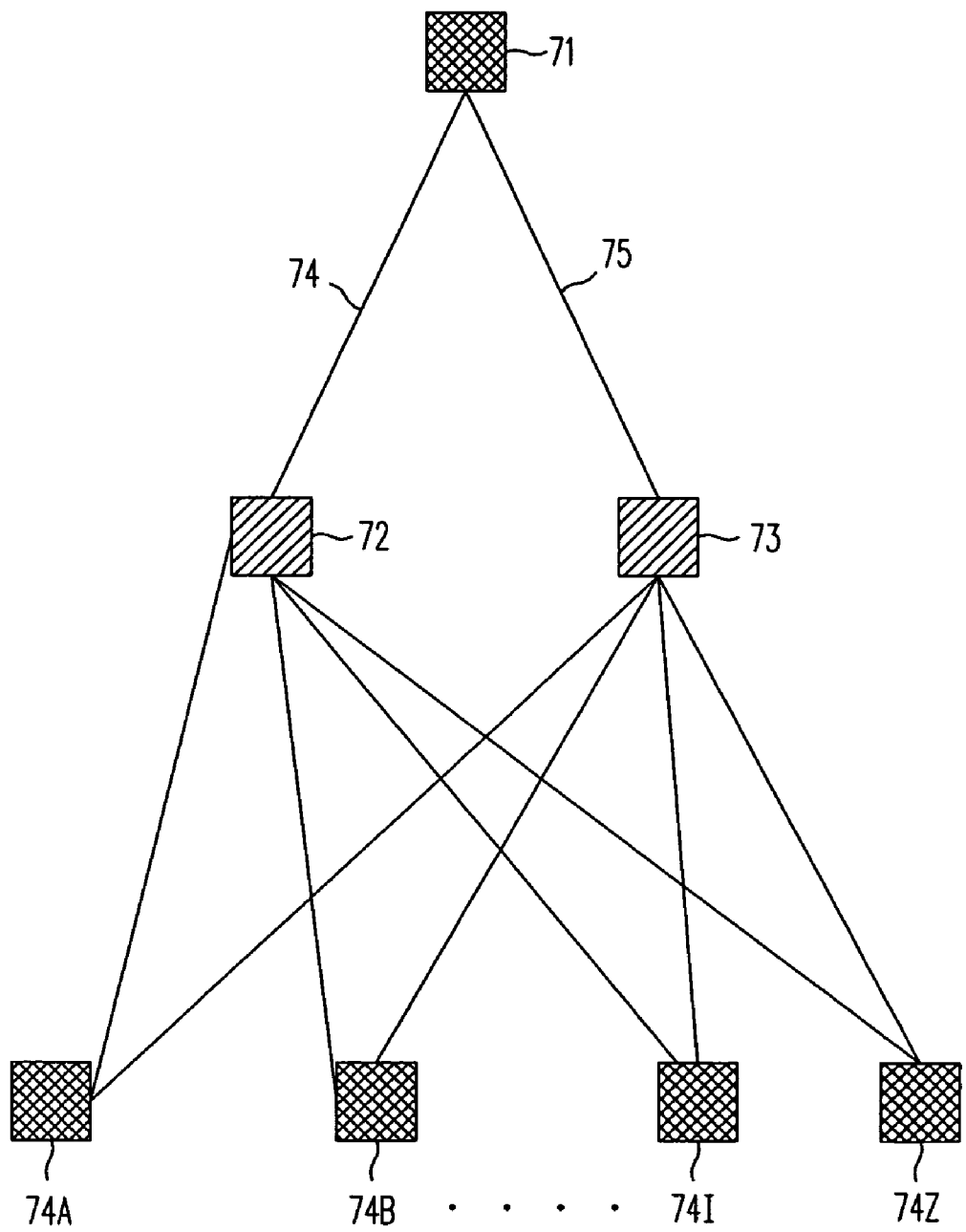
FIG. 7 illustrates, in a block diagram, use of the second switch to broadcast information to a number of destinations that are also connected to the third switch for real time switchover on detection of a fault.

A butterfly network with two paths as described herein can be used for broadcast of information. For example, in one embodiment, a first switch 71 (FIG. 7) is coupled to each of second switch 72 and third switch 73 by first path 74 and second path 75 respectively (for clarity, various switches along paths 74 and 75 are not shown in FIG. 7). Each of second switch 72 and third switch 73 are directly connected to multiple destinations 76A-76Z ($A \leq I \leq Z$) for broadcast of same information thereto, although only one (e.g. switch 72) is used initially.

On failure of broadcast from switch 72, control logic 16 (FIG. 3) reprograms the switches within the butterfly network to perform a switch over (e.g. in real time) to broadcast the same information from switch 73 (using path 75). Depending on the implementation, control logic 16 (FIG. 3) can identify the switches for second path 75 (FIG. 7) either dynamically (i.e. after occurrence of the fault), or statically (e.g. even prior to use of first path 74). In a static implementation, each path from a source switch is held in the form of labels in memory 20 (see FIG. 3; e.g. a non-volatile memory), so that a switch over can be performed instantaneously (i.e. in real time).

In one embodiment, memory 20 holds the paths to all possible pairs of two destination switches, from every switch in a butterfly network. Specifically, in a butterfly network having n switches, and if each switch can be the source switch, there can be a total of $(n-1)(n-2)/2$ pairs of destinations, so that memory 20 holds labels in a total of $n(n-1)(n-2)$ lists (wherein each list holds labels for a single path, and there are two lists for each source switch: one list for the first path and another list for the second path).

Furthermore, note that although switches are identified in the figures as being located in a row or column, these locations are merely illustrative of connections among these switches (and do not denote the actual physical locations of these switches).

Numerous modifications and adaptations of the embodiments described herein would be apparent to the skilled artisan in view of the disclosure. For example, memory 20 can be partitioned into n portions (not shown), one portion for each switch, each portion containing $(n-1)(n-2)$ lists. Moreover, the invention can be applied to networks larger (having a larger number of connections per switch, or having a larger number of switches or both) than a butterfly network, for example if a butterfly network forms a subset of the larger network.

Numerous such modifications and adaptations of the embodiments described herein are encompassed by the attached claims.

The invention claimed is:

1. A method comprising:
    generating a first set of one or more labels, wherein
        the first set of one or more labels identifies a first path in a butterfly network,
        the first path couples a first switch and a second switch,
        the first path comprises a first group of one or more switches,
        the butterfly network comprises the first group of one or more switches, and
        each of the first set of one of more labels identifies at least one switch within the first group of one or more switches;
    generating a second set of one or more labels, wherein
        the second set of one or more labels identifies a second path in the butterfly network,
        the second path couples the first switch and a third switch,
        the second path comprises a second group of one or more switches,
        the first path and the second path are node disjoint with respect to one another,
        the butterfly network comprises the second group of one or more switches, and
        each of the second set of one of more labels identifies at least one switch within the second group of one or more switches;
    selecting a first label from the first set of one or more labels;
    identifying a fourth switch using the first label;
    setting the fourth switch;
    selecting a second label from the second set of one or more labels;
    identifying a fifth switch using the second label;
    setting the fifth switch;
    communicating traffic between the first switch and the second switch via the first path; and
    communicating the traffic between the first switch and the third switch via the second path.

2. The method of claim 1, wherein
    the second switch and the third switch are both coupled to at least one destination switch.

3. The method of claim 1, wherein
    the second switch is a destination switch, and
    the third switch is coupled to transmit traffic to the second switch.

4. The method of claim 1, wherein the butterfly network comprises a switch coupled to transmit traffic to another switch in a same level as the switch.

5. The method of claim 1, wherein
    the setting the fifth switch is performed in response to detection of a failure in the first path.

6. The method of claim 1, further comprising:
    transmitting multicast traffic to both the second switch via the first path and the third switch via the second path, wherein
        the traffic is the multicast traffic, and
        both the second switch and the third switch are destination switches.

7. The method of claim 1, further comprising:
    transmitting first information to the second switch via the first path; and
    transmitting second information to the third switch via the second path, wherein
        the first information and the second information are transmitted to a same destination switch.

8. The method of claim 1, wherein the generating the first set of one or more labels comprises:
    generating a next label identifying a next switch, wherein
        the generating the next label comprises applying a predetermined operation to a preceding label identifying a preceding switch.

9. The method of claim 8, wherein
the predetermined operation is a first operation if the preceding switch is not located on a boundary of the butterfly network, and
the predetermined operation is a reverse operation of the first operation if the preceding switch is located on the boundary of the butterfly network.

10. The method of claim 8, wherein the generating the second set of one or more labels comprises:
generating a second next label identifying a second next switch, wherein
the generating the second next label comprises applying a different predetermined operation to a second preceding label identifying a second preceding switch.

11. A system comprising:
a memory, wherein
the memory is configured to store
a first set of one or more labels, and
a second set of one or more labels;
a butterfly network; and
a control module, wherein
the control module is coupled to the memory and the butterfly network,
the first set of one or more labels identifies a first path in the butterfly network,
the second set of one or more labels identifies a second path in the butterfly network,
the first path couples a first switch and a second switch,
the second path couples the first switch and a third switch,
the first path comprises a first group of one or more switches,
the second path comprises a second group of one or more switches,
the butterfly network comprises the first group of one or more switches and the second group of one or more switches,
the first set of one of more labels identifies at least one switch within the first group of one or more switches,
the second set of one of more labels identifies at least one switch within the second group of one or more switches,
the first path and the second path are node disjoint with respect to one another, and
the control module is further configured to
select a first label from the first set of one or more labels,
identify a fourth switch using the first label,
set the fourth switch,
select a second label from the second set of one or more labels,
identify a fifth switch using the second label,
set the fifth switch,
cause communication of traffic between the first switch and the second switch via the first path, and
cause communication of the traffic between the first switch and the third switch via the second path.

12. The system of claim 11, wherein the butterfly network comprises a switch coupled to transmit traffic to another switch in a same level as the switch.

13. The system of claim 11, wherein the control module is further configured to set the fifth switch in response to detection of a failure in the first path.

14. The system of claim 11, wherein the control module is configured to generate the first set of one or more labels, wherein generation of the first set of one or more labels comprises:

generating a next label identifying a next switch, wherein
the generating the next label comprises applying a predetermined operation to a preceding label identifying a preceding switch.

15. The system of claim 14, wherein
the predetermined operation is a first operation if the preceding switch is not located on a boundary of the butterfly network, and
the predetermined operation is a reverse operation of the first operation if the preceding switch is located on the boundary of the butterfly network.

16. The system of claim 15, wherein the control module is configured to generate the second set of one or more labels, wherein generation of the second set of one or more labels comprises:
generating a second next label identifying a second next switch, wherein
the generating the second next label comprises applying a different predetermined operation to a second preceding label identifying a second preceding switch.

17. A system comprising:
means for generating a first set of one or more labels, wherein
the first set of one or more labels identifies a first path in a butterfly network,
the first path couples a first switch and a second switch,
the first path comprises a first group of one or more switches,
the butterfly network comprises the first group of one or more switches, and
each of the first set of one of more labels identifies at least one switch within the first group of one or more switches;
means for generating a second set of one or more labels, wherein
the second set of one or more labels identifies a second path in the butterfly network,
the second path couples the first switch and a third switch,
the second path comprises a second group of one or more switches,
the first path and the second path are node disjoint with respect to one another,
the butterfly network comprises the second group of one or more switches, and
each of the second set of one of more labels identifies at least one switch within the second group of one or more switches;
means for selecting a first label from the first set of one or more labels;
means for identifying a fourth switch using the first label;
means for setting the fourth switch;
means for selecting a second label from the second set of one or more labels;
means for identifying a fifth switch using the second label;
means for setting the fifth switch;
means for communicating traffic between the first switch and the second switch via the first path; and
means for communicating the traffic between the first switch and the third switch via the second path.

18. The system of claim 17, wherein
the means for setting the fifth switch is responsive to detection of a failure in the first path.

19. The system of claim 17, wherein
multicast traffic is transmitted to both the second switch via the first path and the third switch via the second path, and both the second switch and the third switch are destination switches.

20. The system of claim 17, wherein first information is transmitted to the second switch via the first path, second information is transmitted to the third switch via the second path, and the first information and the second information are transmitted to a same destination switch.

* * * * *